No. 706,466. Patented Aug. 5, 1902.
B. L. STOWE.
HYDRAULIC OR FIRE HOSE.
(Application filed Jan. 2, 1902.)

(No Model.)

Witnesses

Inventor:
Benjamin L. Stowe
Attorney.

UNITED STATES PATENT OFFICE.

BENJAMIN L. STOWE, OF JERSEY CITY, NEW JERSEY.

HYDRAULIC OR FIRE HOSE.

SPECIFICATION forming part of Letters Patent No. 706,466, dated August 5, 1902.

Application filed January 2, 1902. Serial No. 88,211. (No model.)

*To all whom it may concern:*

Be it known that I, BENJAMIN L. STOWE, a citizen of the United States, and a resident of Jersey City, in the county of Hudson and State of New Jersey, have invented a new and useful Improvement in Hydraulic or Fire Hose, of which the following is a specification.

It is my object to produce hydraulic or fire hose which while possessing great strength and durability shall at the same time be reduced in weight and made light enough to compete in this respect—that is to say, in point of lightness—with cotton hose. To this end the hose which I have devised is composed of a rubber-lined seamless single-ply tubular fabric and one or more plies of "frictioned" or cemented and preferably biased duck applied to the exterior of the tubular single-ply seamless inner fabric, the whole being vulcanized together, with an outer covering of rubber.

I will first describe by reference to the accompanying drawings the manner in which my invention is or may be carried into effect and will then point out in the claims those features which I believe to be new and of my own invention.

Figure 1:
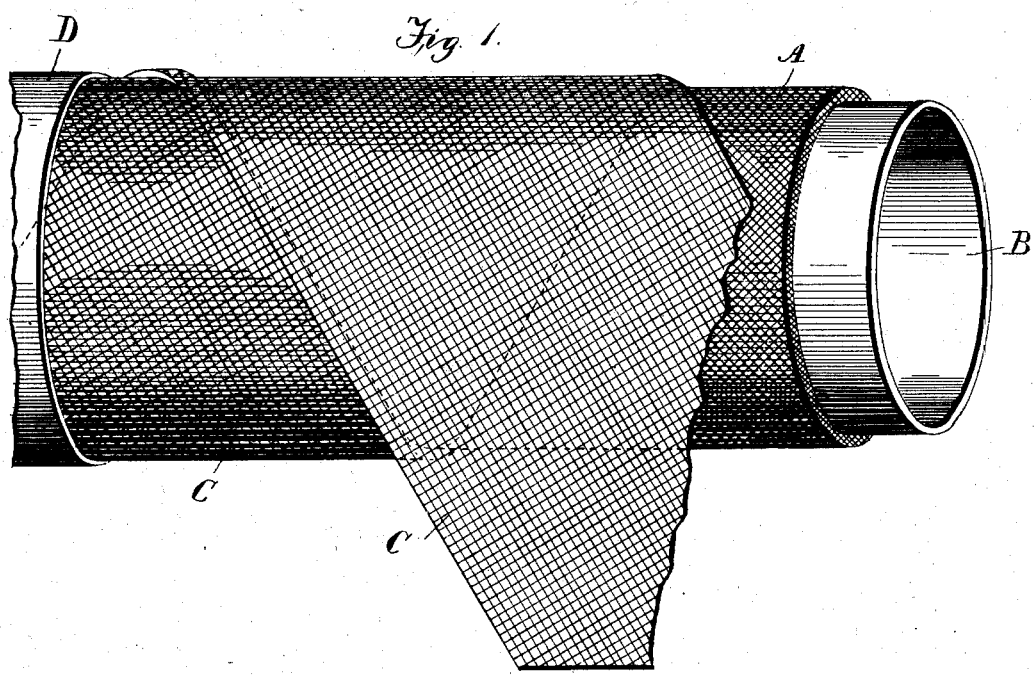
Figure 2:
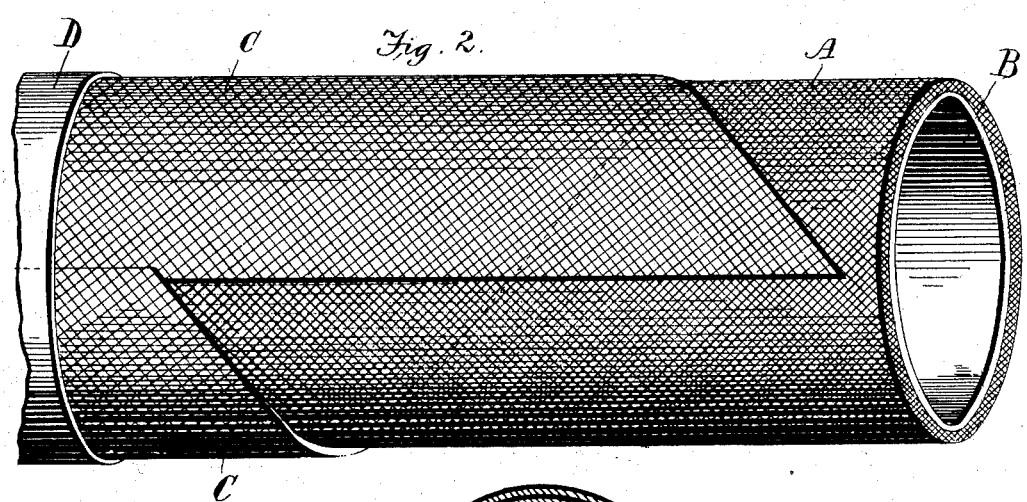
Figure 3:
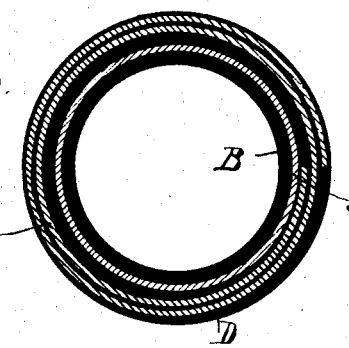

In the drawings, Figure 1 represents in perspective a piece of fire-hose embodying my improvement, the different plies being broken away to expose those beneath. Fig. 2 is a view of a modification. Fig. 3 is a cross-section of the hose.

A is the seamless inner woven single-ply fabric tube. B is the rubber lining therefor. C is the biased duck covering, which is laid on the inner ply in one, two, or three or more plies, as desired, and is designed to protect the inner seamless ply against abrasion, wear, &c., and D is the outer rubber coat.

To make this hose I proceed as follows: I take a seamless fabric tube A, which is made very light, but of a strength sufficient to endure the strain to which hose in practical fire-department service is subject. This tube I rubber-line, as at B, and I also preferably "friction" its exterior—that is to say, thinly coat its exterior surface with adhesive rubber. The inner fabric can also be antiseptically treated, if desired, to prevent decay. Within this prepared tubular inner ply I insert a steel mandrel or apply sufficient internal pressure to cause the tubular prepared fabric to be rigidly distended and itself act as a mandrel, and I then apply to it the outer wrappings of duck C and the exterior ply D of rubber and then cure or vulcanize the hose in the usual way. The duck C prior to its application is frictioned—that is to say, is thinly covered on both faces with adhesive rubber—so that it will when applied adhere to the inner ply, the outer rubber ply, and to itself. In lieu of frictioning the duck I can coat or surface it with rubber-cement for the purpose of securing the adhesion of the plies. The duck is preferably biased in order to make the hose more pliable and to equalize the strain. The biased effect is obtained in Fig. 1 by taking a duck strip having the warps longitudinal and winding it spirally around the inner ply. It is obtained in Fig. 2 by taking a bias-cut duck strip of the length of the mandrel (or hose section thereon) and of a width sufficient to encircle the inner tube one, two, three, four, or more times, according to the number of plies desired, and then wrapping this strip upon the inner tube. The duck, however, may have its warp parallel with the axis of the hose, if desired, or one or more of its plies may be straight and one or more may be biased. It is generally preferred, however, that the duck shall be biased. In this way I secure not only greater initial strength for the hose, but also a strength that is not liable to be impaired by the abrasion or service, as the strength is inherent in the seamless inner ply, which cannot become worn until the inclosing plies of duck are worn away. Hose thus made, while of comparatively light weight, is of ample strength for fire-department service, is not liable to contract in length or elongate or expand excessively, and its outer surface, as above stated, may be considerably worn without vitally or materially reducing the strength of the hose. The rubber covering D can be of any thickness desired. Indeed, it may consist of the outer friction coat upon the duck, which will serve as a light covering when vulcanized.

In Fig. 3, which is a cross-section of the hose embodying my invention, the outer duck wrapping C is composed of a piece of frictioned duck wrapped twice around the seamless inner fabric tube A, the outer frictioned coat upon the duck serving as a light rubber covering D. The thickness of the frictioned coat in this figure is somewhat exaggerated in order to better illustrate the structure of the hose as a whole.

What I claim herein as new, and desire to secure by Letters Patent, is—

Hydraulic hose consisting of an inner seamless fabric rubber-lined tube, and an outer wrapping of rubber-coated duck upon said inner tube, the whole vulcanized together as set forth.

In testimony whereof I have hereunto set my hand this 16th day of December, 1901.

BENJAMIN L. STOWE.

Witnesses:
NATHAN STOWE,
FRANCIS J. McMULLEN.